April 21, 1964    A. SCHNEIDER    3,130,239
REACTION OF METHYLCYCLOPENTANE AND MIXED C₄ HYDROCARBONS
Filed May 28, 1962
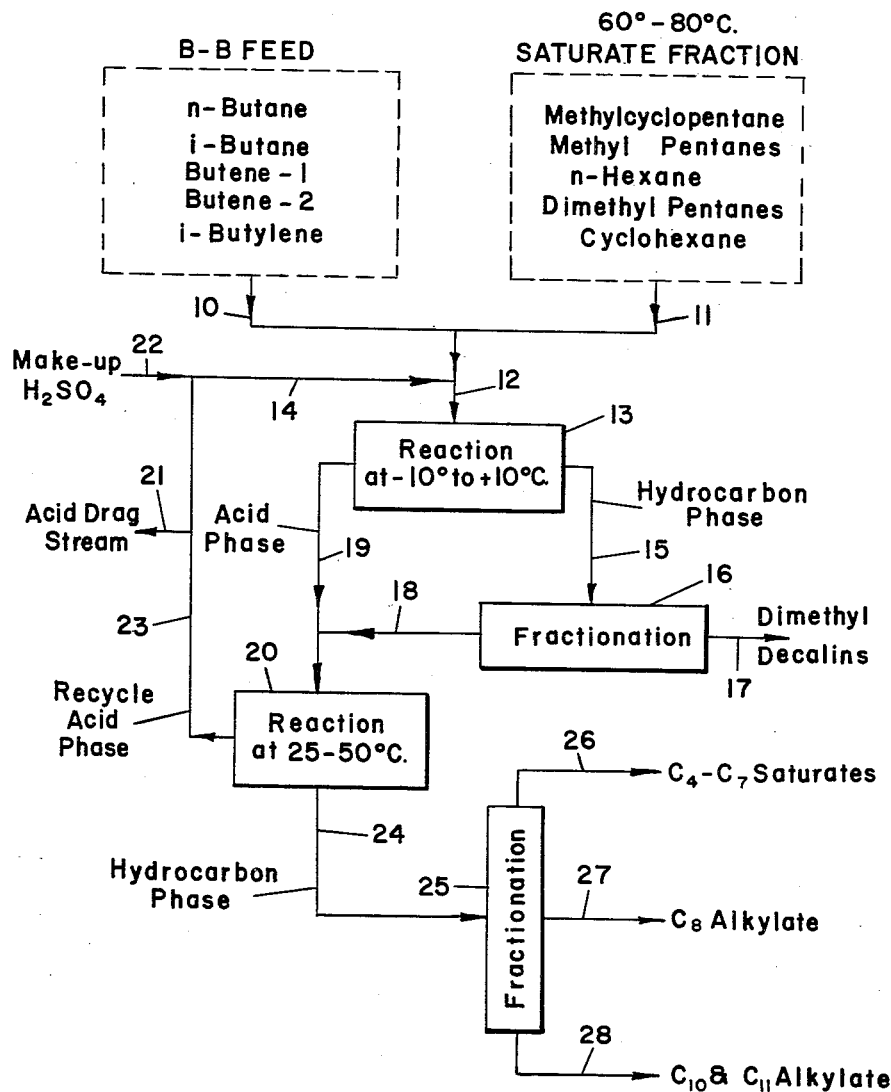
INVENTOR:
ABRAHAM SCHNEIDER
BY George L. Church
ATTORNEY

United States Patent Office 3,130,239
Patented Apr. 21, 1964

3,130,239
REACTION OF METHYLCYCLOPENTANE
AND MIXED C$_4$ HYDROCARBONS
Abraham Schneider, Overbrook Hills, Pa., assignor to Sun Oil Company, Philadelphia, Pa., a corporation of New Jersey
Filed May 28, 1962, Ser. No. 198,116
10 Claims. (Cl. 260—666)

This invention relates to the reaction of methylcyclopentane in the presence of C$_4$ hydrocarbons including butene and isobutylene. More particularly the invention concerns a process in which methylcyclopentane is reacted in the presence of mixed C$_4$ olefins under conditions whereby the methylcyclopentane undergoes self-alkylation to form dimethyldecalins, isobutylene in the feed is converted to isobutane and butenes produce ester derivatives which are utilized in a further step of the process for preparing valuable alkylation products.

Dimethyldecalins (dimethyldecahydronaphthalenes) are useful intermediates for the preparation of various intermediates containing functional groups. For example, dimethyldecalins can be dehydrogenated froming dimethylnaphthalenes which can be oxidized under controlled conditions to the corresponding dicarboxylic acids. The 2,6-dicarboxylic acid is a particularly desirable product, since it can be converted to the 2,6-diester which can be polymerized to produce resins having highly desirable properties for various commercial applications.

The present invention provides a process for producing dimethyldecalins from methylcyclopentane. The dimethyldecalins can be utilized as sources of individual isomers, as high quality jet engine fuels or as special solvents. At the same time the process yields as additional end products saturate hydrocarbon alkylates, such as C$_8$ and higher isoparaffins and/or alkyl monocyclic naphthenes, which are useful as gasoline blending stocks or as chemical intermediates.

According to the invention, a C$_4$ hydrocarbon stock containing n-butene and isobutylene, such as so-called B-B refinery stocks, is admixed with a methylcyclopentane stock. The latter can be methylcyclopentane itself or a mixture of methylcyclopentane with other saturate hydrocarbons normally associated therewith such as n-hexane, methylpentanes, cyclohexane, dimethylpentanes, n-heptane, methylhexanes, methylcyclohexane and the like. The mixture is contacted with sulfuric acid at a temperature in the range of —30 to +20° C. Under these conditions the methylcyclopentane undergoes self-alkylation whereby dimethyldecalins are formed. The isobutylene in the charge acts as a hydrogen acceptor and becomes converted into isobutane. However the other C$_4$ olefins (i.e., butene-1 and butene-2) function in a different manner, being converted into sulfuric acid esters. After these reactions have occurred, the reaction mixture is separated into an acid phase which contains the sulfuric acid esters and a hydrocarbon phase. The latter contains the dimethyldecalin products which can be recovered therefrom by distillation.

Further in accordance with the invention, the acid phase is admixed with a saturate hydrocarbon stock which contains one or more hydrocarbons having a tertiary carbon atom. In one embodiment of the invention this stock can be the hydrocarbons obtained from the hydrocarbon phase resulting from the preceding reaction after the dimethyldecalins have been removed. These hydrocarbons invariably include isobutane formed from the isobutylene in the feed and may also contain additional tertiary carbon-containing material such as isobutane from the B-B feed and isoparaffins and/or alkylcyclohexanes from the other charge material, i.e., the saturate hydrocarbon feed. In another embodiment of the invention the stock which is mixed and reacted with the acid phase can be derived from any other source that provides one or more tertiary carbon-containing saturate hydrocarbons. For example, individual hydrocarbons can be used, such as isobutane, isopentane, methylpentane, isooctane, methylcyclohexane, dimethylcyclohexane or the like; or the stock can be a mixture of saturate hydrocarbons such as aromatic-free straight run naphtha fractions including n-paraffins along with tertiary carbon-containing hydrocarbons. The specified type of stock, regardless of its source, is contacted with the ester-containing acid phase at a temperature in the range of 20 to 100° C. This causes the tertiary carbon-containing compound or compounds to react with the esters and thereby become alkylated to form products having four more carbon atoms per molecule. For example, when the compound used is isobutane, the alkylation product obtained is composed essentially of dimethylhexanes. When a tertiary carbon-containing naphthene is present in the feed to this step, it will form an alkylnaphthene having four more carbon atoms than the naphthene charged. The reaction that occurs serves not only to form useful alkylation products but also to regenerate the sulfuric acid by decomposition of the esters and release of sulfuric acid. The regenerated sulfuric acid is then recycled to the first reaction step.

From the foregoing it can be seen that the result of the present process is to produce dimethyldecalins and various alkylation products in a manner whereby the sulfuric acid can be continuously re-used. The process permits considerable flexibility in the particular charge materials used and in the particular alkylation products that can be obtained. Essential requirements of the process are a feed stock providing C$_4$ olefins including both butene and isobutylene and another stock providing methylcyclopentane.

The invention is described more specifically in conjunction with the accompanying drawing which is a schematic illustration of one embodiment of the present process. In this embodiment the feed material which provides methylcyclopentane is considered to be a typical saturate hydrocarbon fraction of straight run petroleum boiling in the range of 60–80° C. and the other feed material is a B-B refinery stock including all of the C$_4$ hydrocarbons.

As indicated in the drawing the B-B feed contains n-butane, isobutane, butene-1, butene-2 and isobutylene. The 60–80° C. naphtha fraction typically is composed predominantly of methylcyclopentane, methylpentanes and n-hexane and it may also contain dimethylpentanes and cyclohexane in minor amounts. The B-B feed from line 10 and the 60–80° C. fraction from line 11 are mixed and the mixture passes through line 12 into a first reaction zone indicated at 13. Sulfuric acid is added to the mixture via line 14. The volume ratio of acid to hydrocarbons fed to zone 13 generally should be in the range of 0.5:1 to 5:1 and more preferably 1:1 to 3:1. Suitable agitating means (not shown) should be provided for zone 13 to maintain the mixture in the form of an emulsion. The temperature should be maintained in the range of —30 to +20° C. and more preferably —10 to +10° C. The reaction time in this step can vary considerably depending to large extent upon the reaction temperature selected and generally can range from 1 minute to 20 hours.

The sulfuric acid fed to zone 13 should have a strength of 88–100% H$_2$SO$_4$ by weight and more preferably 90–98%. Strength as here used is calculated on a hydrocarbon-free basis and relates to the proportion of H$_2$SO$_4$ to water present. Actually in continuous operation with recycling of the acid as illustrated in the drawing, the acid will contain some hydrocarbon material dissolved therein but its presence is not taken into account in determining the acid strength. Preferably the amount of hydrocarbon material in the acid fed to zone 13 is maintained below 20% by weight. This can be done by removing a drag stream of acid, as indicated by line 21, and adding fresh sulfuric acid as make-up through line 22. The removed acid can be regenerated in any suitable manner and then fed back to the process.

Under the above-described conditions the reactions which occur for the various hydrocarbon components indicated in the drawing are as follows:

(1) Methylcyclopentane loses one hydrogen atom per molecule and dimerizes to dimethyldecalins.

(2) Isobutylene acts as a hydrogen acceptor and converts to isobutane.

(3) Butene-1 and butene-2 react with the sulfuric acid to form esters soluble in the acid phase.

All of the other components are substantially inert under the reaction conditions. This applies to n-butane and isobutane in the B-B feed as well as to cyclohexane and the various paraffin components in the 60-80° C. fraction. The selectivity of the reactions that occur is fortuitous, since it minimizes the types of materials produced and avoids an unduly complex reaction product that would otherwise present a difficult separation problem.

After reacting in zone 13 the mixture is allowed to settle into an upper hydrocarbon layer and a lower acid layer. This conveniently can be done merely by passing the mixture into a settling zone (not shown) and separately withdrawing the acid and hydrocarbon phases therefrom. The hydrocarbon phase is sent, as indicated by line 15, to a fractionation zone 16 which can be conventional distillation column. Since the dimethyldecalins boil substantially above any of the other hydrocarbons in the mixture, the dimethyldecalins can readily be separated and obtained as an end product of the process as indicated by line 17. The lighter hydrocarbons are removed from zone 16 as shown by line 18 and are thereafter utilized in the second stage reaction of the process.

The hydrocarbons from line 18 together with the acid phase from line 19 are passed to the second reactor indicated at 20 wherein a higher temperature is maintained than that employed in the first reaction zone. The temperature should be in the range of 20-100° C. and more preferably 25-50° C. The time allowed for reaction will vary depending upon the reaction temperature selected and generally can range from 10 minutes to 20 hours. Agitation is again provided to secure intimate contact between the acid and hydrocarbon phases. Under these conditions the esters present in the acid phase will react with any hydrocarbon present that contains a tertiary carbon atom but will not react with the other hydrocarbons. Thus n-butane, n-hexane and cyclohexane will not undergo reaction. Each of the tertiary carbon-containing compounds is capable of adding a butyl group derived from the esters. Hence isobutane will combine with the butyl group to become $C_8$ alkylate which is essentially dimethylhexanes. The methylpentanes and any unreacted methylcyclopentane will add a butyl group and become $C_{10}$ alkylate. Dimethylpentanes will react in a similar manner and become $C_{11}$ alkylate.

Following the reaction in zone 20 the mixture is passed into another settling zone (not shown) wherein it stratifies into a hydrocarbon layer and a lower acid layer. The acid phase is recycled for re-use as indicated by line 23. The hydrocarbon phase is passed through line 24 to a second fractionation zone 25 where the hydrocarbons can be separated into any desired fractions according to boiling range. As indicated in the drawing a fraction composed of $C_4$–$C_7$ saturates is removed through line 26. This fraction will contain n-butane, n-hexane and cyclohexane and also any isobutane, methylpentanes and dimethylpentanes that may have been in excess of the esters in the acid and hence would not have been consumed in the reaction. This fraction also can contain any methylcyclopentane not consumed in the two reaction stages of the process. The $C_8$ alkylate removed as indicated by line 27 is composed essentially of dimethylhexanes. The $C_{10}$–$C_{11}$ alkylate obtained as residuum through line 28 constitutes the conversion products of the methyl and dimethylpentanes and also of some methylcyclopentane which may not have been consumed in the first stage reaction of the process.

The feasibility of above-described process depends upon the fact that under the conditions specified the reactions that will occur are selective with respect to certain components of the feed materials. Thus, of the components constituting the 60–80° C. fraction, only the methylcyclopentane will undergo the self-alkylation reaction whereby one hydrogen atom is given up per molecule and the intermediate species formed dimerizes to dimethyldecalins. The other components of the 60–80° C. fraction are substantially inert in the first reaction stage conducted at –30 to +20° C., preferably –10 to +10° C. Likewise selectivity obtains in the reactions of the $C_4$ olefins at this temperature. The butenes react with the sulfuric acid to form butyl esters, whereas isobutylene acts as a hydrogen acceptor and converts to isobutane. In the second reaction stage which is preferably conducted at 25–50° C., selectivity occurs between the tertiary carbon-containing compounds on the one hand and those not containing tertiary carbon on the other. Only the former react with the sulfuric acid esters to produce alkylate of higher molecular weight while the hydrocarbons not having a tertiary carbon atom are essentially inert.

In the embodiment of the invention shown in the drawing and described above, all the hydrocarbon material from the first reaction which boils below dimethyldecalins is used to provide the tertiary carbon-containing compounds needed in the second reaction. The process can be modified, however, to use only one of the available tertiary carbon-containing compounds in the second reaction. For example, if only $C_8$ alkylate is desired, the hydrocarbon phase from reaction zone 13 can be fractionated to obtain isobutane separately and only the isobutane can be used to effect the reaction in zone 20. On the other hand, it may be desirable in some cases to employ a tertiary carbon-containing compound from an outside source. For instance, methylcyclopentane derived from some other source can be fed to zone 20 along with the ester-containing acid phase to form alkylcyclopentanes which will isomerize to alkylcyclohexanes having ten carbon atoms. If desired, this product could be isomerized and then dehydrogenated to produce tetramethylbenzenes. Various other modifications of the process will be apparent.

The dimethyldecalins produced by the present process are a mixture of isomers which is characteristically different from mixed dimethyldecalins obtained in other ways. The present product appears to be substantially all isomers of the cis form whereas mixed dimethyldecalins produced by other procedures generally include at least a substantial proportion of trans isomers which are lower boiling. For example, mixed dimethyldecalins can be prepared by isomerizing any $C_{12}$ dicyclic naphthene by means of an $AlBr_3$-HBr catalyst. Such procedure is disclosed and claimed in my copending application Serial No. 69,798, filed November 17, 1960, now abandoned. The product so obtained is practically all isomers of the trans form and boils substantially completely below the boiling range of the dimethyldecalin isomers obtained by the present process. The present product also is unusual in that isomers having methyl groups attached to the same ring predominate over those in which substitution occurs on both rings. This has been shown by dehydrogenating the dimethyldecalins prepared according to the invention and then analyzing the resulting mixture of dimethylnaphthalenes by vapor phase chromatography. The following are typical analytical results for the reaction product obtained by effecting the self-alkylation of methylcyclopentane at three different temperatures within the herein specified range:

| Reaction temperature | 4° C. | −7° C. | −21° C. |
|---|---|---|---|
| Composition of naphthalenes, wt. percent: | | | |
| 2,6- and 2,7-dimethylnaphthalene [1] | 2.4 | 1.6 | 1.2 |
| 2,3-dimethylnaphthalene | 19.2 | 12.9 | 7.9 |
| 1,2-dimethylnaphthalene [2] | 19.1 | 22.5 | 22.5 |
| 1,3-dimethylnaphthalene | 8.9 | 5.2 | 4.5 |
| 1,4-dimethylnaphthalene [2] | 22.2 | 28.4 | 32.1 |
| 1,5-dimethylnaphthalene [2] | 18.6 | 23.2 | 25.5 |
| 1,6-dimethylnaphthalene | 7.5 | 4.0 | 3.4 |
| 1,7-dimethylnaphthalene | 2.2 | 1.5 | 1.3 |
| 1,8-dimethylnaphthalene [2] | | 0.8 | 1.9 |

[1] Includes any ethylnaphthalene present.
[2] These isomers favored by lowering reaction temperature.

It can be seen from these data that compounds having two methyl groups on the same ring predominate. In contrast, dimethyldecalin mixtures produced by my prior process described in application Serial No. 69,798, when dehydrogenated and analyzed in the same manner as above, are found to be composed predominantly of isomers having a methyl group attached to each ring. The data presented above also show that certain isomers (indicated by reference (2)) are favored by lowering the temperature of the self-alkylation reaction.

A further distinguishing characteristic of the dimethyldecalin product produced in the present process is that none of the components will crystallize from the mixture at −80° C. This is in contrast to the product made by my prior process, which exhibits copious crystallization at temperatures considerably higher than −80° C. The absence of crystallization of the present product at low temperatures is a highly desirable characteristic with respect to its use as a fuel for jet engines. Also the present product, being essentially cis isomers, has a higher density than other dimethyldecalin products which include the trans isomers. Hence the present product as a jet fuel will provide more energy per unit volume than other dimethyldecalin products.

I claim:

1. Process which comprises: (1) admixing a saturate hydrocarbon stock containing methylcyclopentane with a C₄ hydrocarbon stock containing n-butene and isobutylene and with sulfuric acid having a strength of 88–100%; (2) maintaining the mixture at a temperature in the range of −30 to +20° C. for a time to effect reaction, whereby methylcyclopentane is converted to dimethyldecalins, isobutylene is converted to isobutane and n-butene reacts with the sulfuric acid to form esters; (3) separating from the reaction mixture a hydrocarbon phase containing the dimethyldecalins and an acid phase containing the esters; (4) separating dimethyldecalins from the hydrocarbon phase; (5) admixing the acid phase with saturate hydrocarbon stock containing at least one hydrocarbon having a tertiary carbon atom; (6) maintaining the resulting mixture at a temperature in the range of 20 to 100° C. for a time to effect reaction, whereby alkylation of said saturate hydrocarbon stock with the esters occurs; and (7) separating from the resulting reaction mixture an alkylation product phase and an acid phase.

2. Process according to claim 1 wherein hydrocarbons boiling below the dimethyldecalins obtained in step (4) constitute said saturate hydrocarbon stock for step (5).

3. Process according to claim 1 wherein isobutane formed in the reaction of step (2) constitutes said saturate hydrocarbon stock for step (5).

4. Process according to claim 1 wherein the acid phase from step (7) is recycled to step (1) to supply sulfuric acid thereto.

5. Process according to claim 1 wherein the temperature in step (2) is −10 to +10° C.

6. Process according to claim 5 wherein the temperature in step (6) is 25–50° C.

7. Process according to claim 1 wherein the temperature in step (6) is 25–50° C.

8. Process according to claim 1 wherein said strength of sulfuric acid is 90–98%.

9. Process for producing mixed dimethyldecalins particularly suited as jet engine fuel which comprises: (1) contacting methylcyclopentane, n-butene and isobutylene with sulfuric acid having a strength of 88–100% at a temperature in the range of −30 to +20° C.; (2) separating the reaction mixture into an acid phase and a hydrocarbon phase; (3) separating dimethyldecalins from the hydrocarbon phase; and (4) regenerating the acid phase for re-use by contacting it at a temperature in the range of 20 to 100° C. with saturate hydrocarbon having a tertiary carbon atom.

10. Process according to claim 9 wherein said acid strength is 90–98%, the temperature in step (1) is −10 to +10° C. and the temperature in step (4) is 25 to 50° C.

References Cited in the file of this patent

UNITED STATES PATENTS

| | | |
|---|---|---|
| 2,435,402 | McAllister et al. | Feb. 3, 1948 |
| 2,476,750 | Matuszak | July 19, 1949 |
| 2,668,865 | Schneider | Feb. 9, 1954 |
| 2,683,754 | Kennedy et al. | July 13, 1954 |
| 2,852,581 | Stiles | Sept. 16, 1958 |